July 15, 1930.  A. D. SUMMERS  1,770,438
CORNICE MOLD
Filed Aug. 4, 1928
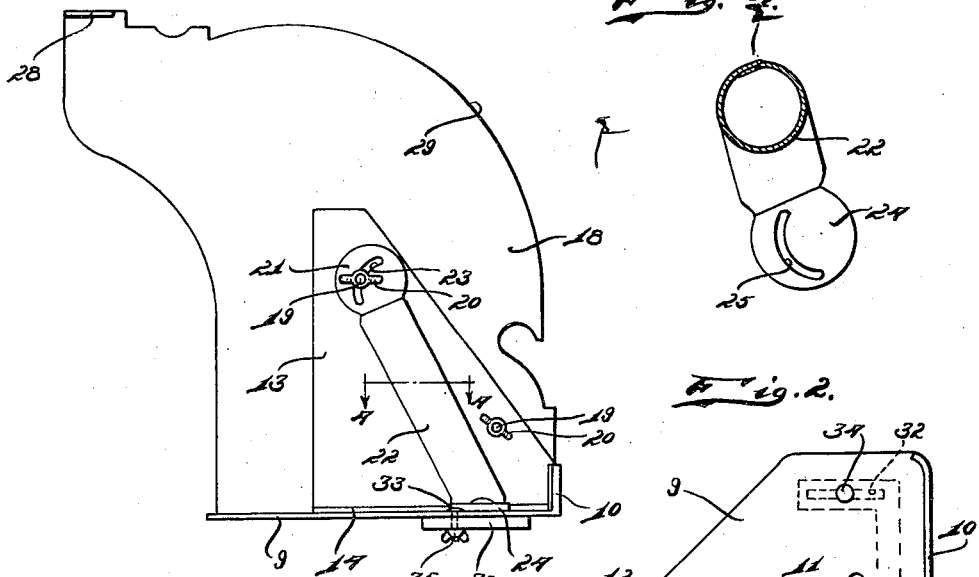
INVENTOR.
Alfred D. Summers.
BY
Thos Donnelly
ATTORNEY.

Patented July 15, 1930

1,770,438

UNITED STATES PATENT OFFICE

ALFRED D. SUMMERS, OF DETROIT, MICHIGAN

CORNICE MOLD

Application filed August 4, 1928. Serial No. 297,402.

My invention relates to a new and useful improvement in a cornice mold adapted for use by plasters and similar artisans in forming cornice molds and has for its object the provision of a cornice mold which will be light, durable and economically manufactured.

Another object of the invention is the provision of a cornice mold having an adjustable handle attached thereto whereby the handle may be adjusted to accommodate various conditions.

Another object of the invention is the provision of a supporting plate having a mold plate mounted thereon and adjustable as to its location thereon.

Another object of the invention is the provision in a cornice mold of this class of simple and inexpensive means for securing the mold plate in position.

Another object of the invention is the provision of a cornice mold having the various parts separable from each other.

Other objects will appear hereinafter.

The invention consists in the combination and arrangement of parts hereinafter described and claimed.

The invention will be best understood by a reference to the accompanying drawings which form a part of this specification and in which, Fig. 1 is a side elevational view of the invention.

Fig. 2 is a top plan view of the invention.

Fig. 3 is a front elevational view of the invention with parts broken away and parts shown in section.

Fig. 4 is a view taken on line 4—4 of Fig. 1.

It is intended that the device be made preferably from metal such as aluminum or other light material so that a minimum weight will be provided, although to those skilled in the art it will appear that the device may be made from other material if desired. A base plate 9 is provided along its forward edge with an upwardly projecting flange 10. Elongated parallel extending slots 11 and 12 are formed in the base plate 9. A retaining plate 13 is provided with a flange 14 which extends at right angles thereto and through which are passed the bolts 15 which engage in the slots 11 and 12 and upon each of which is threaded a wing nut 16. A guide plate or auxiliary retaining plate 17 is provided with a flange 18' which extends at right angles thereto and is adapted to engage the upper surface of the base plate 9. This plate 17 is substantially a duplicate of the plate 13 in shape and size. Bolts 19 are projected through the plate 17 and through a mold plate 18 which is positioned between the plates 17 and 13. These bolts 19 extend through openings formed in the retaining plate 13 and are provided with wing nuts 20.

In the drawings I have shown two of the bolts 19, the upper of which extends through the angularly turned flattened end 21 of the handle 22, this flattened end 21 being provided with an arcuate slot 23 for reception of the bolt 19. The opposite end of the handle 22 is provided with the flattened angularly turned end 24 having the arcuate slot 25 formed therein for accommodating a bolt 26 which projects through the slot 11 and which is provided with the wing nut 27.

The mold plate 18 is provided adjacent its upper end with a laterally turned tongue 28 which serves as a guide or engagement member for engaging the ceiling when the device is used. The edge 29 of the mold plate 18 is formed of a contour to correspond with the outer surface of the cornice desired to be formed, and this mold plate may be removed from between the plates 17 and 13 and replaced with a minimum alteration of the entire device.

By providing the elongated slots 11 and 12 the relative position of the mold plate and the base plate 9 may be varied so that a smooth and easy operation of the device may be accomplished, resulting from an even balance of the device, this even balance being determined by the relative location of the base plate and the mold plate. By forming the arcuate slots in the flattened ends of the handle 22 an adjustment of the handle to accommodate the worker and to meet various conditions may be effected. In forming the handle 22 it is preferred to form it from a single stamping.

Mounted on the undersurface of the base plate 9 is a guide strip 30 having the transversely extended slots 31 and 32, through which are projected bolts 33 and 34 for securing this guide strip in fixed relation to the base plate 9, the wing nuts 35 serving to bind the strip 30 in position. This strip is used where it is desired to finish an exterior cornice or form a cornice at an exterior corner, and serves as an abutment against which may engage a false strip of molding secured to the surface of the structure on which the cornice is to be formed.

In this manner there is provided a secure and operative guide for the cornice mold at all times and the mitering at exterior corners is thus obviated. Eliminating the necessity of mitering has proven most efficient and labor saving.

By making the device of a light metal a light structure is provided which is sufficiently durable for the purpose and which permits of economical manufacture.

While I have illustrated and described the preferred form of my invention I do not wish to limit myself to the precise details of structure shown but desire to avail myself of such variations and modifications as come within the scope of the appended claims.

Having thus described my invention what I claim as new and desire to secure by Letters Patent is:

1. A cornice mold of the class described, comprising: a base plate having elongated slots formed therein; a flange projecting upwardly from one edge of said plate; a pair of spaced retaining plates projecting upwardly from said base plate in spaced relation to each other; means operating in said slots for securing said retaining plates in fixed relation to said base plate; and a mold plate mounted between said retaining plates.

2. A cornice mold of the class described, comprising: a base plate having elongated slots formd therein; a flange projecting upwardly from one edge of said plate; a pair of spaced retaining plates projecting upwardly from said base plate in spaced relation to each other; means operating in said slots for securing said retaining plates in fixed relation to said base plate; a mold plate mounted between said retaining plates; a a handle engaging at one end the upper surface of said base plate and at its opposite end the outer face of one of said retaining plates; and means for locking said handle in various positions of adjustment relatively to said retaining plates.

In testimony whereof I have signed the foregoing specification.

ALFRED D. SUMMERS.